O. L. OLEN.
POWER TRANSMITTING MECHANISM.
APPLICATION FILED MAY 15, 1911.
1,163,846.
Patented Dec. 14, 1915.
2 SHEETS—SHEET 2.
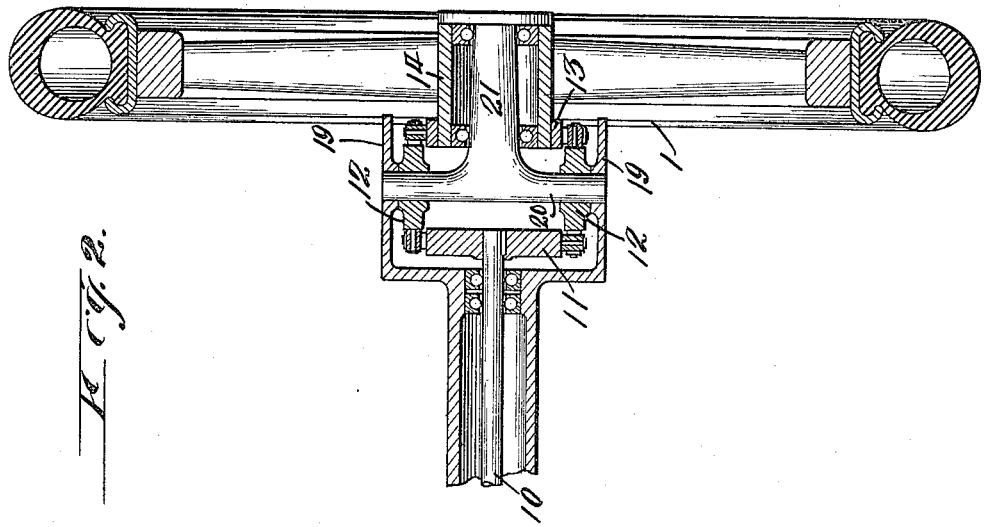
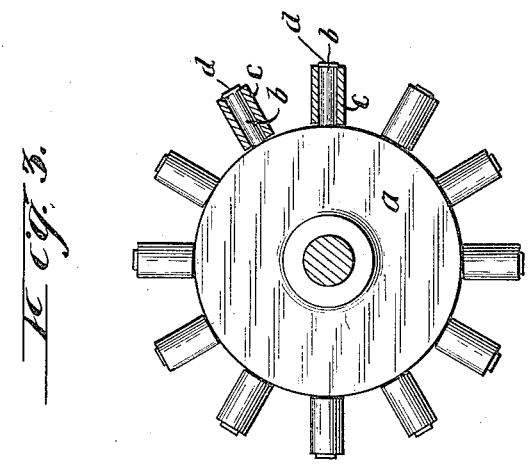
Witnesses
R. L. Farrington
J. D. Bremer
Inventor:
Otto L. Olen
by Ervin & Wheeler
Attys.

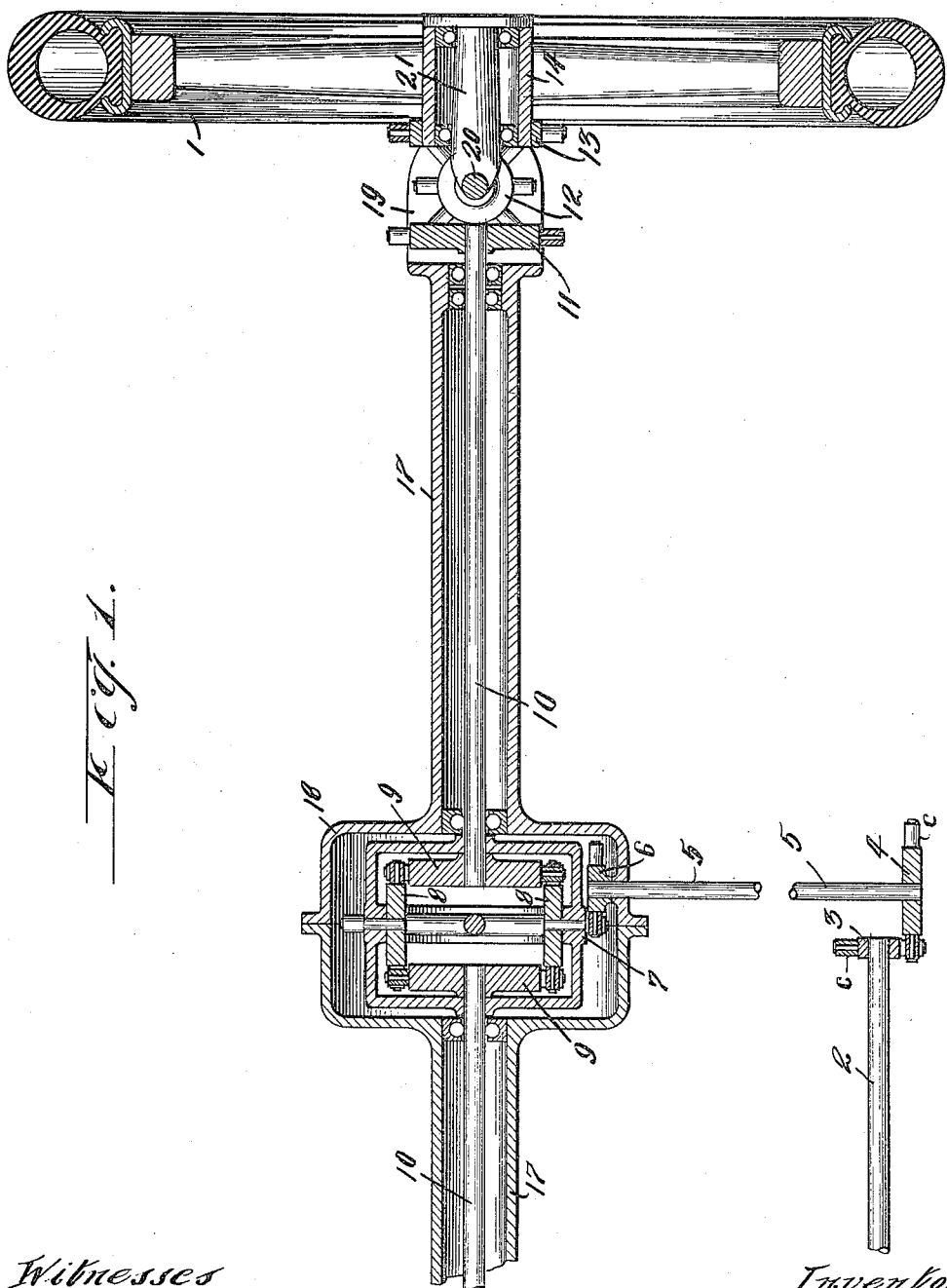

UNITED STATES PATENT OFFICE.

OTTO L. OLEN, OF CLINTONVILLE, WISCONSIN.

POWER-TRANSMITTING MECHANISM.

1,163,846.  Specification of Letters Patent.  Patented Dec. 14, 1915.

Application filed May 15, 1911. Serial No. 627,252.

*To all whom it may concern:*

Be it known that I, OTTO L. OLEN, a citizen of the United States, residing at Clintonville, county of Waupaca, and State of Wisconsin, have invented new and useful Improvements in Power-Transmitting Mechanism, of which the following is a specification.

My invention relates to improvements in driving mechanism for motor driven vehicles.

The object of my invention is to provide improved power transmitting mechanism and relates particularly to the character of the gear members employed for transmitting the motion angularly from one shaft member to another by rolling contact of intermeshing devices carried by a driving member or set of members acting upon similar devices carried by the driven members, said devices rotating upon their own axes, and also traveling about a centrally disposed pivot axis, across which the motion is being transmitted.

In the following description, reference is had to the accompanying drawings, in which—

Figure 1 is a horizontal sectional view of a portion of the power transmitting mechanism of a motor driven vehicle, embodying my invention. Fig. 2 is a vertical sectional view of one of the traction wheels and the adjacent parts of the power transmitting mechanism. Fig. 3 is a detail view of one of the gear members, showing two of the roller teeth in axial section.

Like parts are identified by the same reference characters throughout the several views.

Power is transmitted to the traction wheels 1 from a driving shaft 2 through gear members 3 and 4, shaft 5, pinion 6, driving differential gear member 7, pinions 8, driven differential gear members 9, axle shafts 10, gear members 11, 12 and 13, and hub 14. The tubular supporting axle members 17, differential gear casing 18, forked members 19, steering pivots 20, and stub axles 21, may be substantially of ordinary construction. It therefore need not herein be more specifically described. Each of the gear members and pinions above described are, however, composed of a disk $a$, provided with radially projecting pins $b$, upon which rollers $c$ are mounted, the pins being provided with heads $d$ to prevent the rollers $c$ from slipping off. These rollers $c$ are cylindrical in form and are adapted to rotate upon the pins $b$, thus allowing me to employ gear wheels and pinions exclusively of the spur gear type for transmitting right angle movements without causing excessive friction. For example, the rollers $c$ on the gear member 3 in moving upon the rollers $c$ of the member 4, will cause the rollers $c$ of the member 4 to rotate and the surfaces of the contacting rollers will therefore not wear frictionally, the power being transmitted from one member to another with slight loss. The gear members 8 have trunnion connection with the driving member 7 of the differential. These members 8 revolve bodily with the driving member 7 and are also free to turn upon their supporting trunnions to allow a differential movement in their respective shafts 10. The members 8, therefore, perform the same functions that the beveled pinions perform in an ordinary differential gear mechanism. The type of gearing employed is, however, of a special value in transmitting the motion from the driving axle shafts 10 to the traction wheels. The gear members 13 are mounted directly upon the hubs 14 of the traction wheels and are directly driven by the gear members 12 above and below the axis of the shaft 10, the gear members 12 being mounted upon the pivot post 20 within the arms of the fork 19. The gear members 11 engage both the upper and the lower member 12 and the driving pressure is therefore balanced upon the respective members 11, 12 and 13, the only friction being such as results from the rotation of the rollers $c$ upon their supporting pins $b$.

I am aware that it has heretofore been attempted to provide gear members with roller teeth, but I believe that I am the first to incorporate such gear members in the transmission mechanism of a motor driven vehicle, and in such relations to each other as to secure a balanced pressure upon the driven member of the train, viz: that member which is directly connected with the wheel hub 14. I regard this feature as of great importance, for the reason that the shocks to which traction wheels are subjected would otherwise have a much greater tendency to shear off the pins which support the roller gear teeth, but by balancing the pressure upon the top and bottom sides of the hub, such shearing tendency is reduced to the minimum, and the shocks are largely absorbed by a slight rotation of the rollers c upon their respective pins.

I claim—

A power transmitting mechanism for power driven vehicles, comprising the combination with a traction wheel, of a supporting axle having a forked end provided with a pivot post, a stub axle member operatively connected with said pivot post and arranged in supporting relation to the traction wheel, a set of spur gear members mounted to rotate upon the pivot post, a driving spur gear member having its teeth crossing the teeth of the post supported members, and a driven spur gear member connected with the traction wheel hub and having its teeth crossing the teeth of the post supporting members on the opposite side of the post from that occupied by the driving gear member, each of said gear members having teeth comprising radially projecting headed pins and rollers mounted to rotate upon said pins, in contact with the roller teeth of the intermeshing gear members.

In testimony whereof I affix my signature in the presence of two witnesses.

OTTO L. OLEN.

Witnesses:
 JAS. B. ENVIN,
 I. D. BREMER.

Copies of this patent may be obtained for five cents each, by addressing the "Commissioner of Patents, Washington, D. C."